United States Patent [19]

Wells et al.

[11] Patent Number: 5,363,895
[45] Date of Patent: Nov. 15, 1994

[54] BIAS PLY PNEUMATIC TIRE

[75] Inventors: Thomas H. Wells; James A. Bukowski, both of Akron, Ohio

[73] Assignee: The Goodyear Tire & Rubber Company, Akron, Ohio

[21] Appl. No.: 81,768

[22] Filed: Jun. 23, 1993

[51] Int. Cl.⁵ .............................................. B60C 11/11
[52] U.S. Cl. ................................................. 152/209 R
[58] Field of Search ........................ 152/209 R, 209 D

[56] References Cited

U.S. PATENT DOCUMENTS

| | | | |
|---|---|---|---|
| 2,186,180 | 1/1940 | Sloman et al. | 152/209 R |
| 2,756,797 | 7/1956 | Campbell | 152/209 R |
| 2,770,279 | 11/1956 | Harrison | 152/209 R |
| 3,768,535 | 10/1973 | Holden | 152/209 R |
| 4,122,879 | 10/1978 | Takigawa et al. | |
| 4,362,201 | 12/1982 | Zinnen et al. | |
| 4,641,695 | 2/1987 | Lindner | |
| 4,690,189 | 9/1987 | Bradisse et al. | |
| 4,730,654 | 3/1988 | Yamashita et al. | |
| 4,796,683 | 1/1989 | Kawabata et al. | |
| 4,815,511 | 3/1989 | Brayer et al. | |
| 5,000,239 | 3/1991 | Brayer et al. | |
| 5,088,535 | 2/1992 | Potts et al. | |
| 5,127,455 | 7/1992 | Remick | |
| 5,137,068 | 8/1992 | Loidl et al. | |
| 5,152,852 | 10/1992 | Hisamichi et al. | |

FOREIGN PATENT DOCUMENTS 0133802 11/1978 Japan.
2158406 6/1990 Japan.

OTHER PUBLICATIONS

Everything You Ever Wanted to Know About Sprint Car Tires.
Where to Catch the Outlaws, Apr., 1993, *Open Wheel* pp. 35–41.
Tires, Apr. 1993, by Deuce Turrill, *Open Wheel.*
The World of Outlaws Tour Pennsylvania by Bruce Ellis.
Getting Started in Sprint Car Racing by D. Turrill, Feb., 1993.

*Primary Examiner*—Michael W. Ball
*Assistant Examiner*—Nancy T. Krawczyk
*Attorney, Agent, or Firm*—David L. King

[57] ABSTRACT

A bias ply pneumatic tire 40,80 is disclosed. The tire 40,80 has a tread 42,82 with a plurality of circumferentially continuous grooves 52,72 and a plurality of laterally extending grooves 50,70. The grooves define tread elements 60,90 of parallelogram shape. Each lateral groove 50,70 includes a portion 53,73 extending from a tread edge a distance of at least 5% of the tread width (W). The portion of the groove 53,73 adjacent a tread edge is inclined less than 25° relative to a plane passing through the axis of rotation, preferably inclined 23°. The tread elements 60,90 preferably have radially extending groove walls having an outer portion 69A,79A inclined at 10° and an inner portion 69B,79B inclined at least 30° relative to the radial direction. The tire is particularly well-suited for a rear drive tire for Sprint car racing vehicles.

4 Claims, 13 Drawing Sheets

BIAS PLY PNEUMATIC TIRE

BACKGROUND OF THE INVENTION

This invention relates to a pneumatic tire having a unique tread configuration. The tire is particularly well-suited for use on the drive axle of vehicles that race on oval dirt tracks, such as Sprint cars.

Spring car racing is generally conducted on dirt tracks with a few races conducted on asphalt surfaces. The tracks are oval in shape and usually slightly banked. Ideally, race tires have a large amount of rubber in contact with the track. At most paved tracks, race tire treads are "slicks" which have no grooves. On dirt tracks, however, grooved tread patterns yield the best results.

Unlike a paved surface, dirt tracks can vary in consistency and surface conditions can change during a night of racing. The drivers prefer tires with soft rubber tread compounds on clay surfaced tracks and harder tread rubber compounds on the more abrasive racing surfaces. The tracks are watered down to keep dust to a minimum. As the track dries, the surface gets slick and hard. Under these conditions, drivers prefer hard compounds.

Sprint cars run a unique combination of tires. The front tires are the same from left side to right side. Typically the front tires have a wheel size of 8 inches in width × 15 inches in diameter with the tread width of 8 inches. The front tires weigh about 15.5 pounds and are inflated to about 6–12 psi. The right rear tires have a wheel size of 18 inch width × 15 inch diameter. The right rear tire has a tread width of about 17.5", weighs 33 pounds and is inflated to 6–8 psi. The rear left wheel is the stagger tire. The left wheel size is 14 inches width × 15 inch diameter, weighs about 21.0 pounds and is inflated to 5–6 psi. The tread width is about 14.5 inches. Sprint cars are rear wheel drive vehicles. The rear tires provide forward traction while the front tires provide steering.

As illustrated in FIGS. 1 through 4, the prior art Sprint tire tread employed circumferential and lateral grooves having parallelogram shaped tread elements. At the tread edges, the lateral grooves were oriented at an angle $\theta$ of about 30° relative to a plane passing through the axis of rotation, while the central tread elements were inclined at an angle $\theta_2$ of about 10° relative to the axis of rotation. The tires exhibited an overall net-to-gross ratio of about 71%.

It has been determined that by adjusting the tread pattern, an improved rear race tire has been developed that is well adopted for the hard slick dirt tracks.

SUMMARY OF THE INVENTION

A pneumatic tire having an axis of rotation and an annular tread is disclosed. The tread has a first and a second tread edge. The distance between the edges defines the tread width (W).

The tread has plurality of circumferentially continuous grooves, a plurality of laterally extending grooves, and a plurality of tread elements of parallelogram shape defined by the circumferential and lateral grooves.

Each lateral groove has a portion of the groove extending from a tread edge a distance of at least 5% of the tread width (W) and is inclined less than 25° relative to a plane passing through the axis of rotation.

It is preferred that the lateral groove portion extending from a tread edge be inclined at an angle of about 23° relative to a plane passing through the axis.

It is also preferred that the tread pattern is asymmetrical, has a first portion extending from a first tread edge toward the second tread edge a distance less than 45% of the tread width and having a net-to-gross ratio of less than 0.70, and has a second portion extending from the first portion to the second tread edge and having a net-to-gross ratio of greater than 0.75. The above described preferred tread has an overall net-to-gross ratio of 0.74.

DEFINITIONS

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire.

"Belt structure" means at least two annular layers or plies of parallel cords, woven or unwoven, underlying the tread, unanchored to the bead, and having both left and right cord angles in the range from 17 degrees to 27 degrees with respect to the equatorial plane of the tire.

"Breakers" refers to at least two annular layers or plies of parallel reinforcement cords having the same angle with reference to the equatorial plane of the tire as the parallel reinforcing cords in carcass plies.

"Carcass" means the tire structure apart from the belt structure, tread, undertread, and sidewall rubber over the plies, but including the beads.

"Casing" means the carcass, belt structure, beads, sidewalls, and all other components of the tire including a layer of unvulcanized rubber to facilitate the assembly of the tread, the tread and undertread being excluded. The casing may be new, unvulcanized rubber or previously vulcanized rubber to be fitted with a new tread.

"Center plane" means the plane perpendicular to the axis of rotation of the tread and passing through the axial center of the tread.

"Circumferential" means lines or directions extending along the perimeter of the surface of the annular tread perpendicular to the axial direction.

"Chafers" refers to narrow strips of material placed around the outside of the bead to protect cord plies from the rim, distribute flexing above the rim, and to seal the tire.

"Chippers" mean a reinforcement structure located in the bead portion of the tire.

"Cord" means one of the reinforcement strands of which the plies in the tire are comprised.

"Design rim" means a rim having a specified configuration and width.

"Design rim width" is the specific commercially available rim width assigned to each tire size and typically is between 75 and 90% of the specific tire's section width.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface are occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Inner" means toward the inside of the tire and "outer" means toward its exterior.

"Innerliner" means the layer or layers of elastomer or other material that form the inside surface of a tubeless tire and that contain the inflating fluid within the tire.

"Leading" refers to a portion or part of the tread that contacts the ground first, with respect to a series of such parts or portions, during rotation of the tire in the preferred direction.

"Net-to-gross ratio" means the ratio of the tire tread rubber that makes contact with the road surface while in the footprint, divided by the area of the tread in the footprint, including non-contacting portions such as grooves.

"Nominal rim diameter" means the average diameter of the rim flange at the location where the bead portion of the tire seats.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Ply" means a continuous layer of rubber-coated parallel cords.

"Pneumatic tire" means a laminated mechanical device of generally toroidal shape (usually an open torus) having beads and a tread and made of rubber, chemicals, fabric and steel or other materials. When mounted on the wheel of a motor vehicle, the tire through its tread provides a traction and contains the fluid or gaseous matter, usually air, that sustains the vehicle load.

"Radial" and "radially" means directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height" (SH) means the radial distance from the nominal rim diameter to the outer diameter of the tire at its equatorial plane.

"Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of a sidewall just below the tread edge. Affects cornering.

"Sidewall" means that portion of a tire between the tread and the bead.

"Tire design load" is the base or reference load assigned to a tire at a specific inflation pressure and service condition: other load-pressure relationships applicable to the tire are based upon that base or reference.

"Tracking" means that in a tire/vehicle system where two tires are mounted on separate axles so that a front tire precedes a rear tire when the vehicle is being normally operated in a straight line, the rear tire contacts the same portions of the road surface as did the front tire.

"Trailing" refers to a portion or part of the tread that contacts the ground last, with respect to a series of such parts or portions during rotation of the tire in the preferred direction.

"Tread" means a molded rubber component which, when bonded to a tire casing, includes that portion of the tire which comes into contact with the road when the tire is normally inflated and under normal load.

"Tread arc width" (TAW) means the width of an arc having its center located on the plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subjected to any load.

"Tread width" means the arc length of the tread surface in the axial direction, that is, in a plane passing through the axis of rotation of the tire.

"Unit tread pressure" means the radial load borne per unit area (square centimeter or square inch) of the tread surface when that area is in the footprint nd the tire is loaded.

DETAILED DESCRIPTION OF THE INVENTION

FIGS. 1 through 5 are illustrative of a prior art pneumatic rear drive axle tire 10 having a tread pattern adapted for Sprint car racing on dirt track surfaces. The prior art tire 10 has a plurality of parallelogram shaped tread elements 20 defined by laterally extending grooves 12 and circumferentially continuous grooves 14.

Figure 1:
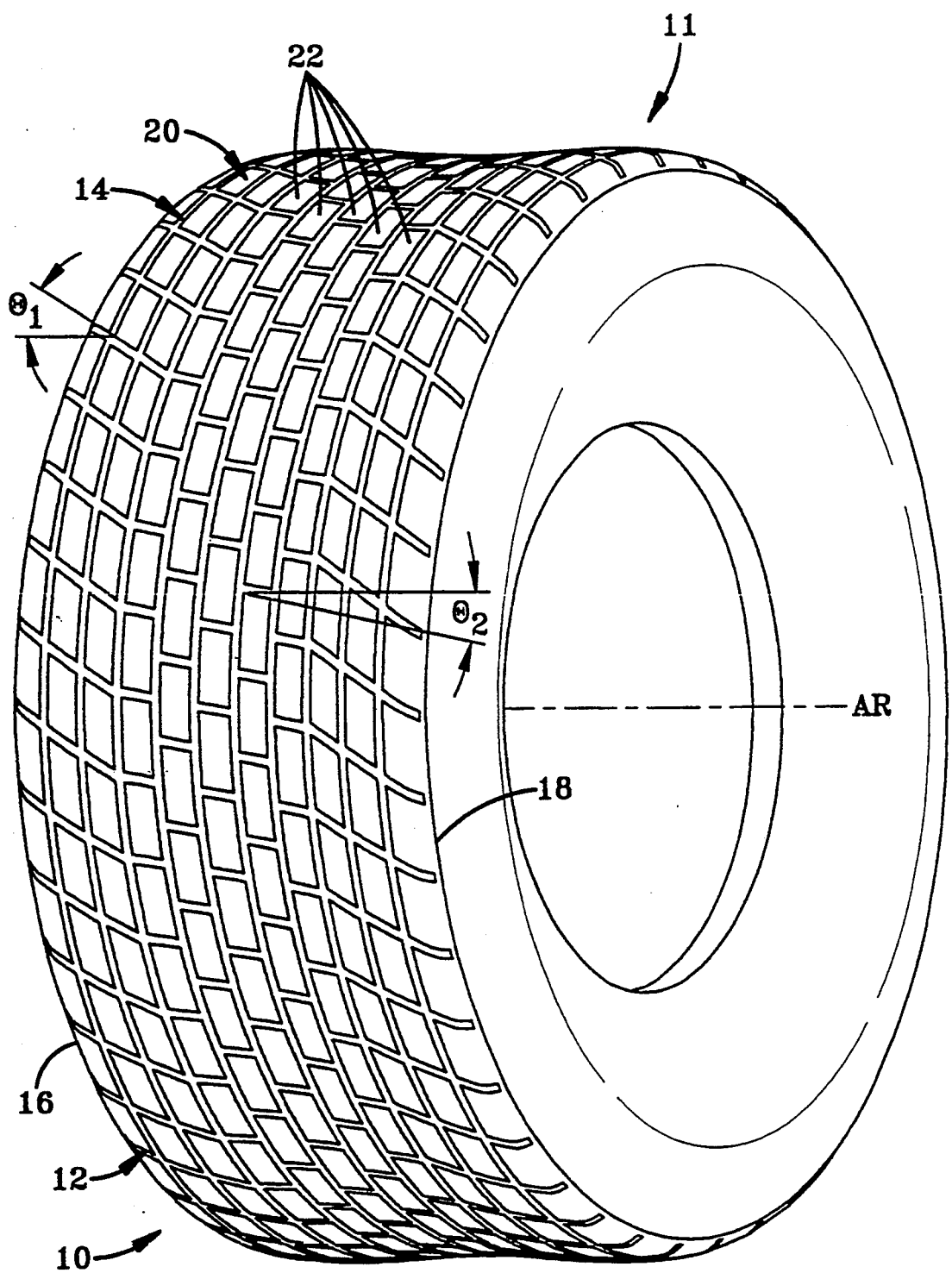
FIG. 1 is a perspective view of the prior art tire.
Figure 2:
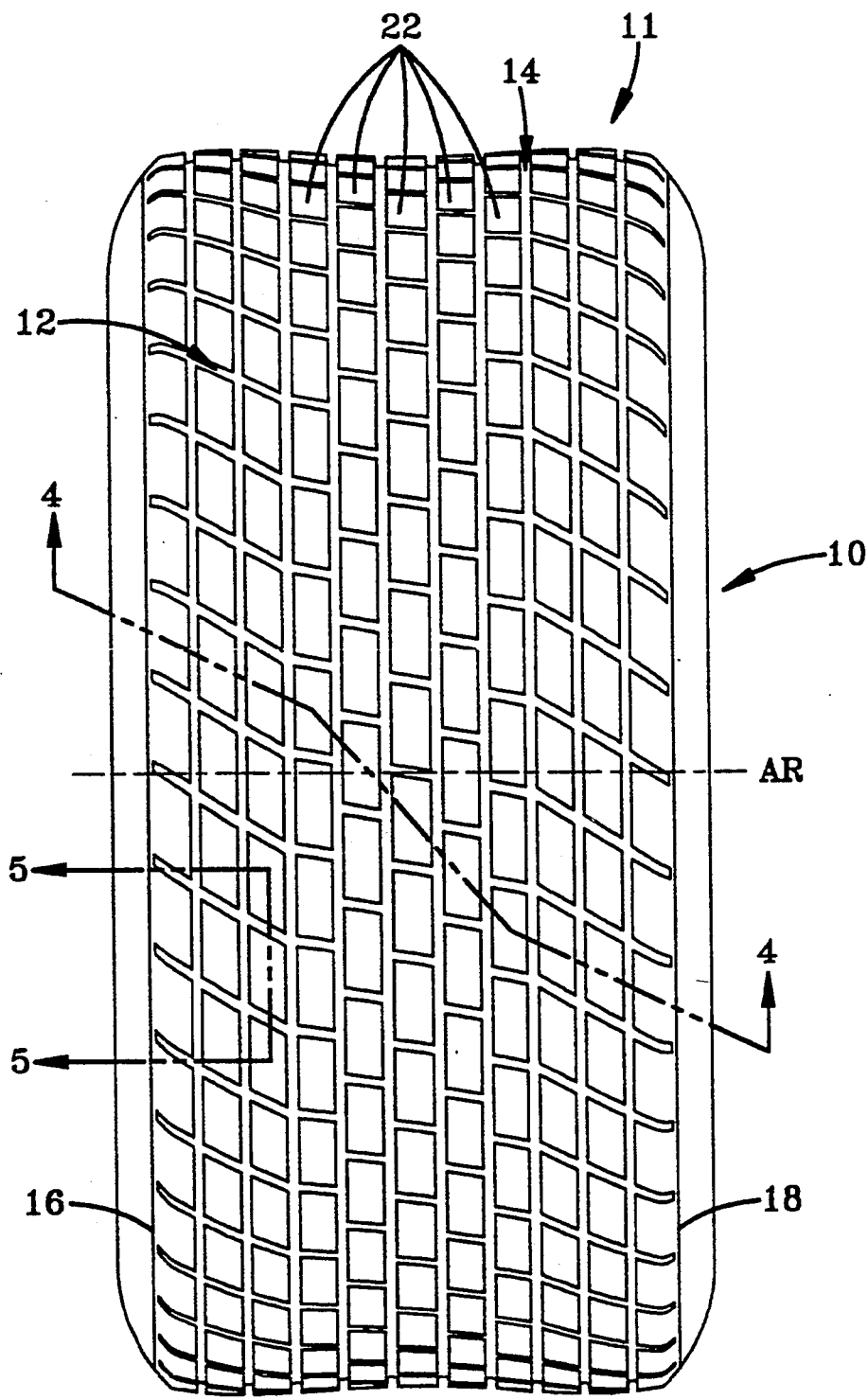
FIG. 2 is a plan view of the prior art mire.
Figure 3:
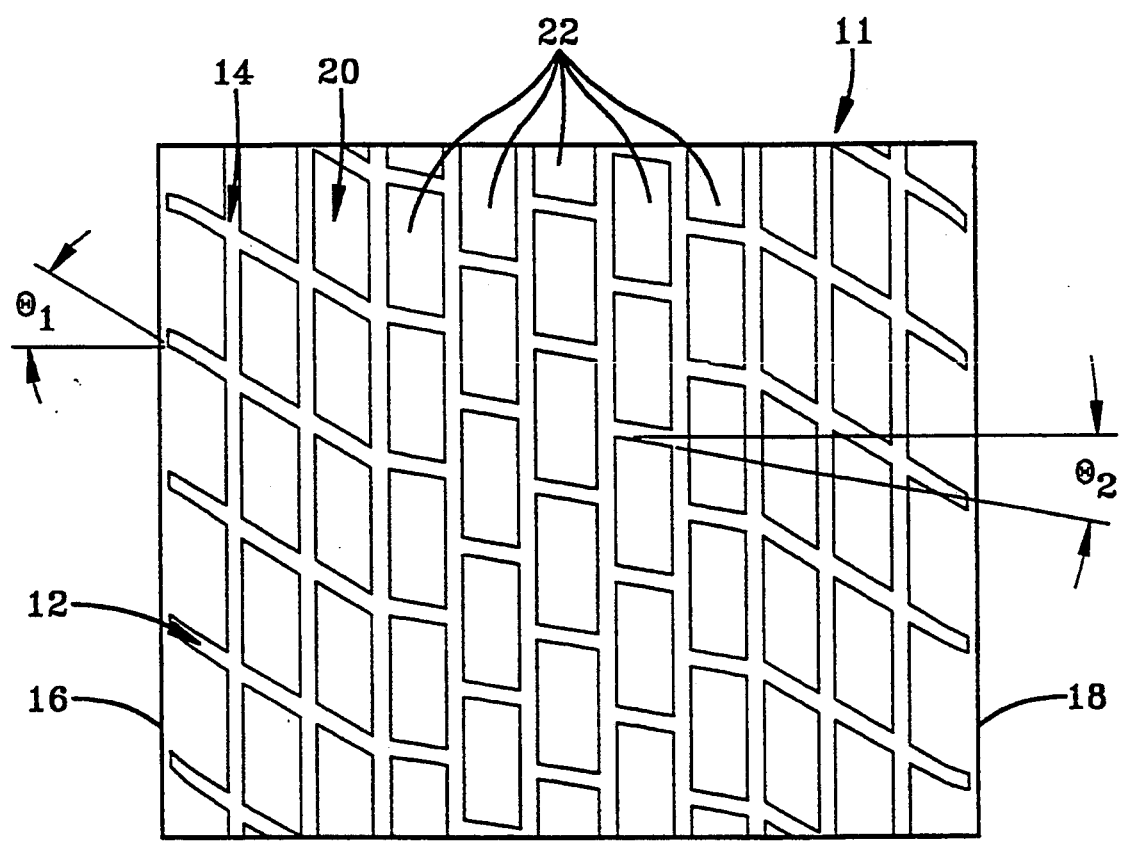
FIG. 3 is an enlarged plan view of a portion of the tread of the tire as shown in FIG. 2.

As shown in FIGS. 2 and 3, the laterally extending grooves included a portion extending from a first tread edge 16 or a second tread edge 18, the portion being inclined at an angle $\theta_1$ of about 30° relative to a plane passing through the axis of rotation. The tread elements 22 in the central portion of the tread 11 have leading and trailing edges inclined at an angle $\theta_2$ of about 10° relative to a plane passing through the axis of rotation.

Figure 4:
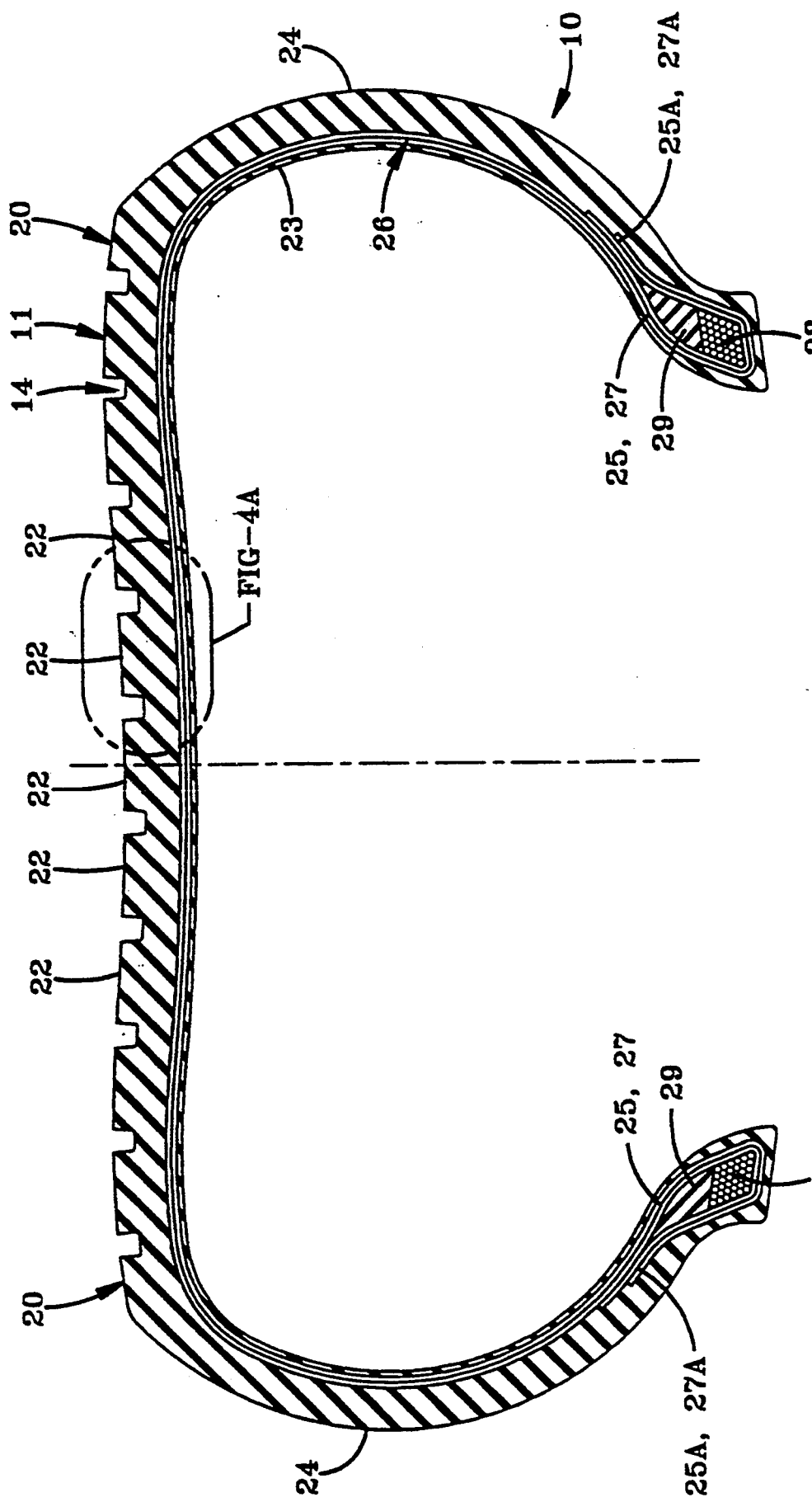
FIG. 4 is a cross-sectional view of the tire as shown in FIG. 1 as taken along lines 4—4.

FIG. 4 illustrates the cross sectional shape of the prior art tire 10. As shown, the tire 10 includes a tread portion 11, a pair of sidewalls 24 and a carcass structure 26. The carcass 26 includes a pair of substantially inextensible annular beads 28, and a pair of carcass plies 25,27 wrapped about and extending between each bead 28, and an inner liner 23. The carcass plies 25,27 include reinforcing cords that are equally but oppositely inclined, thus forming a bias ply construction. Additionally, positioned above each bead 28 and between the carcass plies 25,27 and the ply turnup 25A,27A, is a rubber apex 29. Additionally, a conventional rubber chaffer may be employed.

Figure 4A:
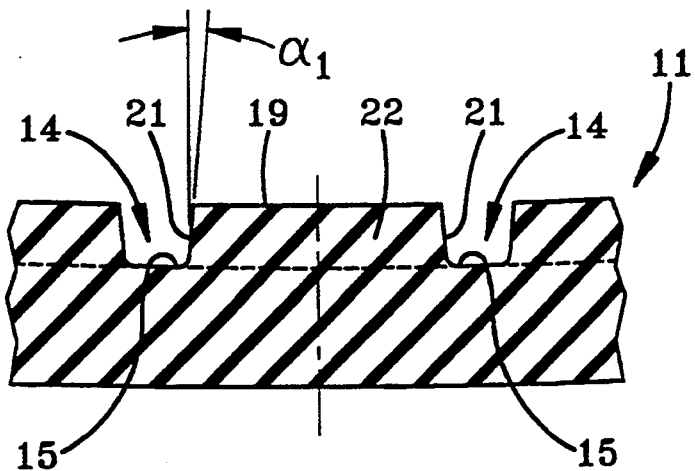
FIG. 4A is an enlarged view of the tread cross-section as taken from FIG. 4.
Figure 5:
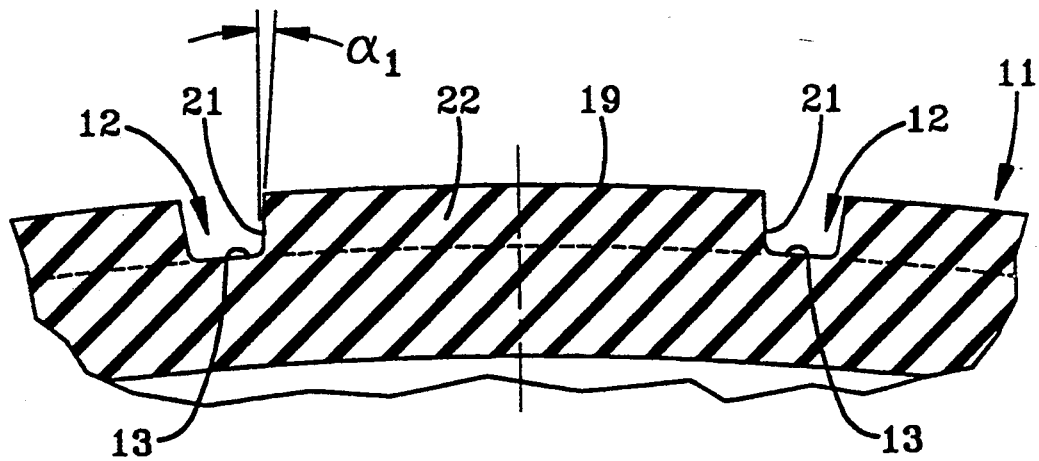
FIG. 5 is an enlarged view of the tread cross-section as taken along lines 5—5 of FIG. 2.

As further illustrated in FIGS. 4A and 5, each tread element 20,22 includes four groove walls 21. The groove walls of the prior art tire radially extend from the base 13,14 of the groove 12,14 to the outer surface 19 of the tread element 20,22, each groove wall 21 being inclined at an angle $\alpha_1$ of about 10° relative to the radial direction.

The tread rubber compound of the prior art tire tread 11 was available in a range of shore hardnesses from 22 to 70 Shore A. The range of softness permits the driver to select the best rubber for the track condition.

The present invention can be employed with asymmetrical tread patterns as illustrated in FIGS. 6 through 9 or in a symmetrical pattern as illustrated in FIGS. 10 through 13. It is believed that the asymmetrical preferred embodiment tire 40 shown in FIGS. 6 through 9 is the best mode of practicing the invention, while the symmetrical tread patterned tire 80 illustrated in FIGS. 10 through 13 exemplify an alternative configuration which employs many of the novel aspects of the claimed invention.

Figure 6:
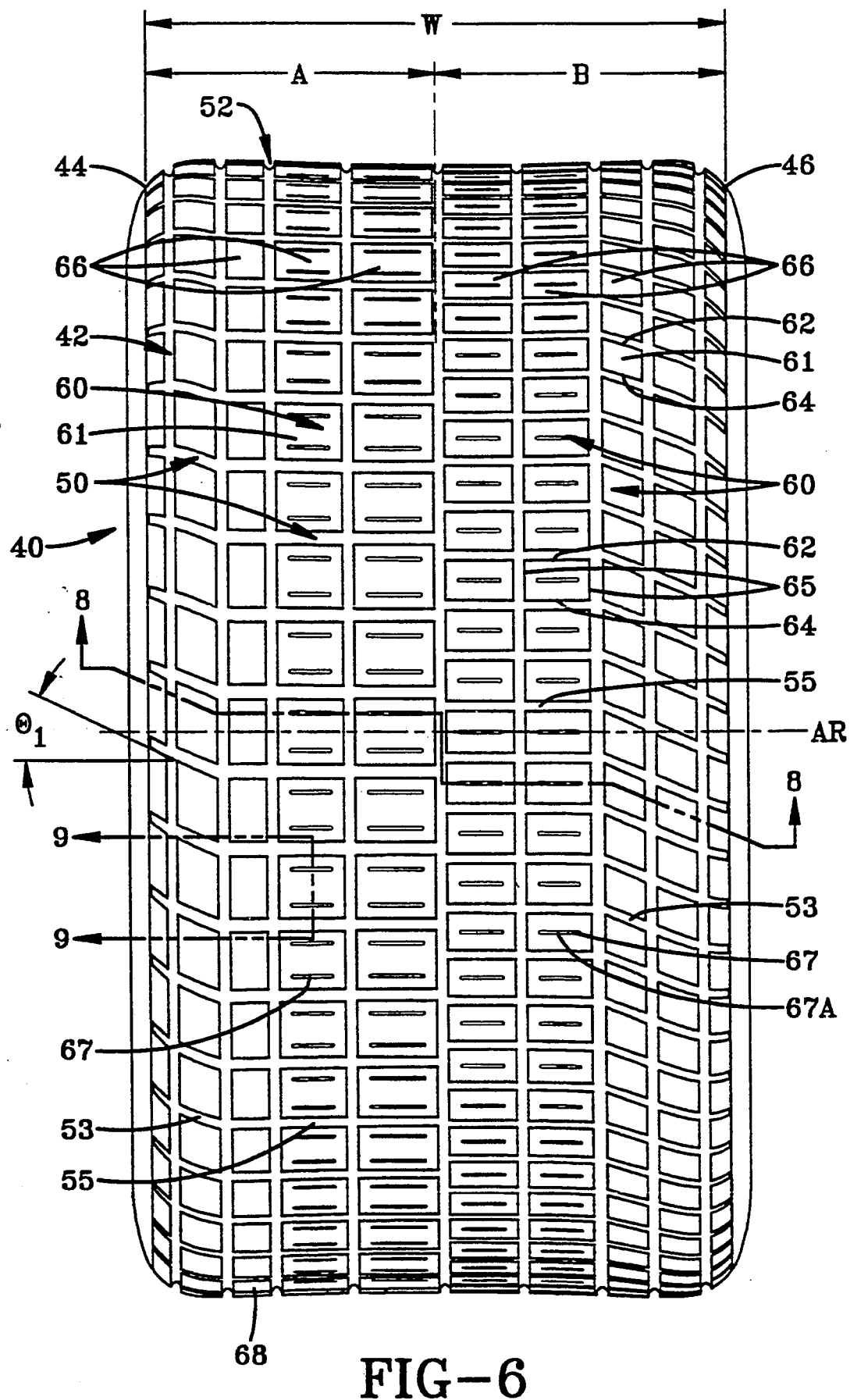
FIG. 6 is a plan view of the tire according to the present invention, the tread being asymmetrical.
Figure 7:
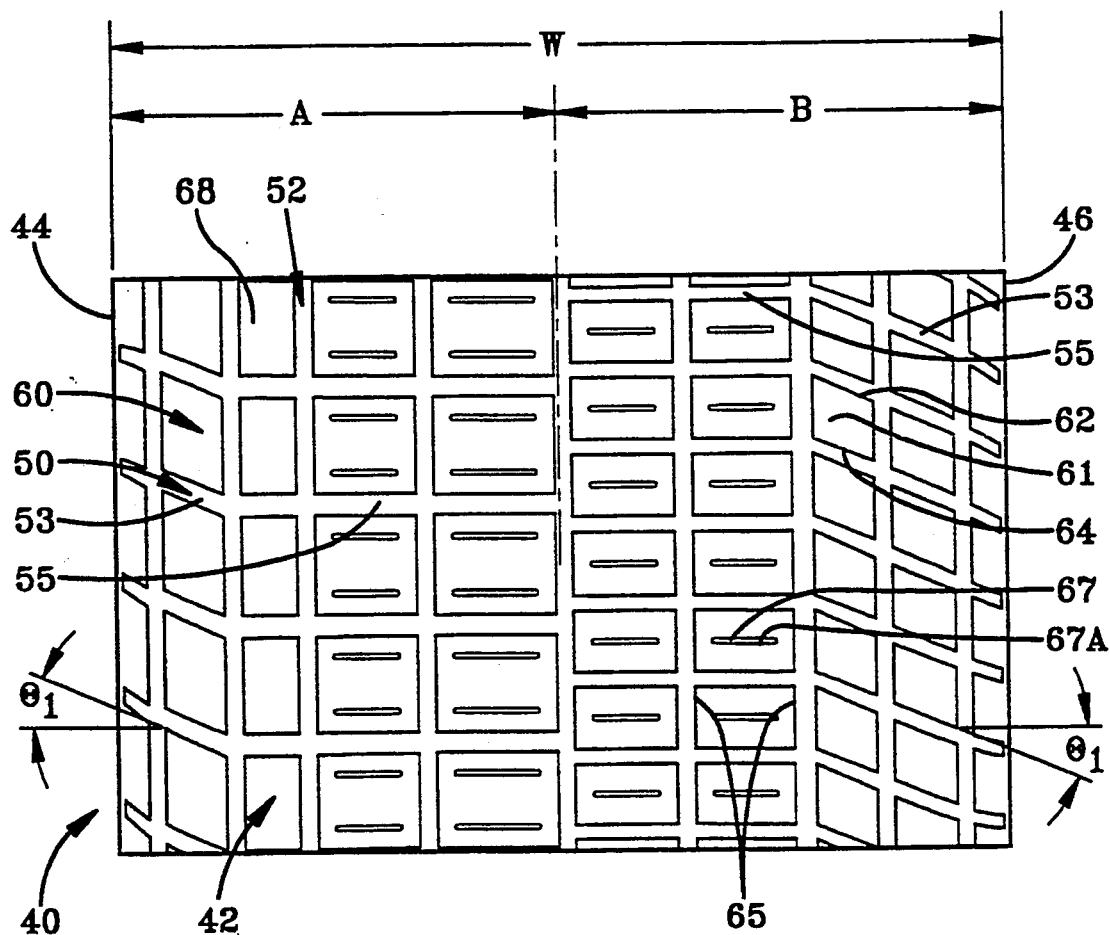
FIG. 7 is an enlarged plan view of a portion of the tread of the tire as shown in FIG. 6.

As shown in FIGS. 6 and 7, the tire 40 has an asymmetrical tread 42, the tread 42 has a first tread edge 44 and a second tread edge 46. The distance between the first tread edge 44 and the second tread edge 46 defines the tread width (W).

Figure 8:
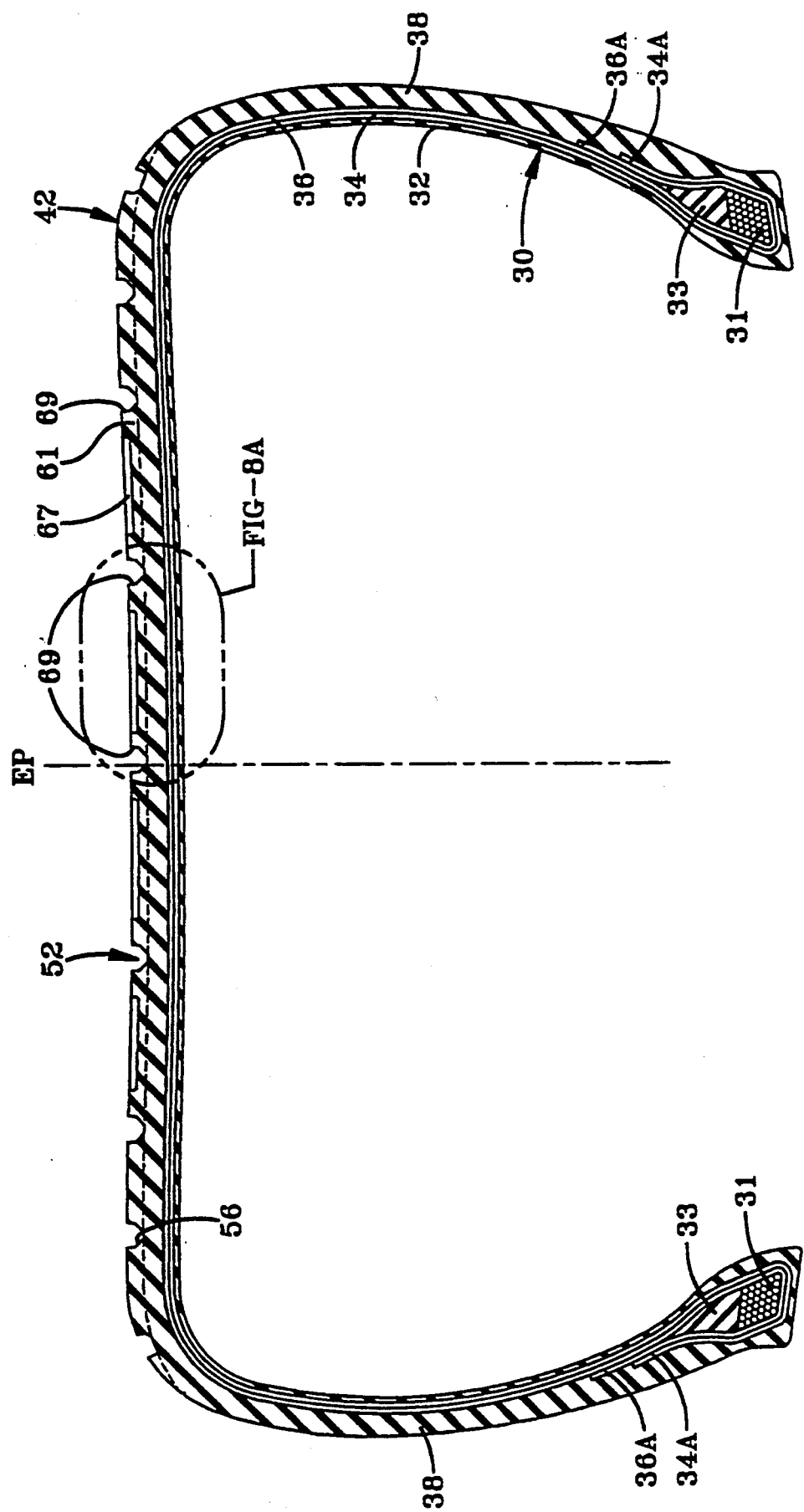
FIG. 8 is a cross-sectional view of the tire taken along lines 8—8 of FIG. 6.
Figure 9:
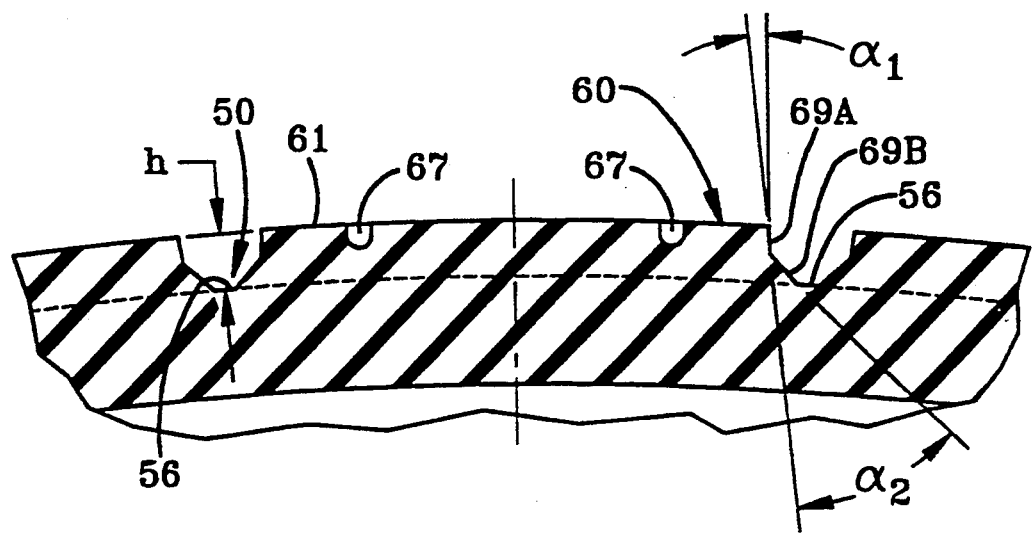
FIG. 9 is an enlarged view of a portion of the tread as taken along lines 9—9 of FIG. 6.
Figure 10:
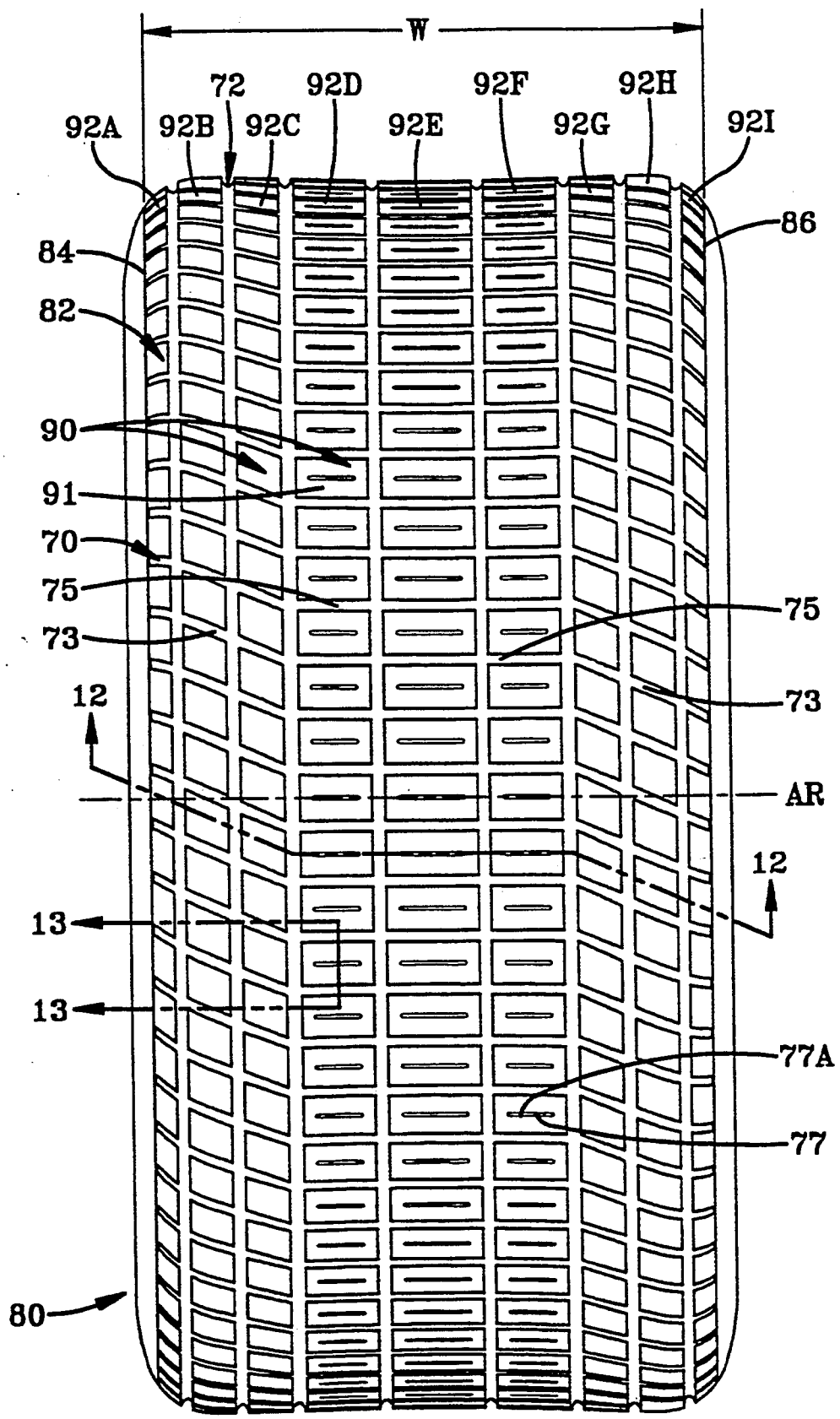
FIG. 10 is a plan view of the tire according to the present invention employing a symmetrical tread pattern.
Figure 11:
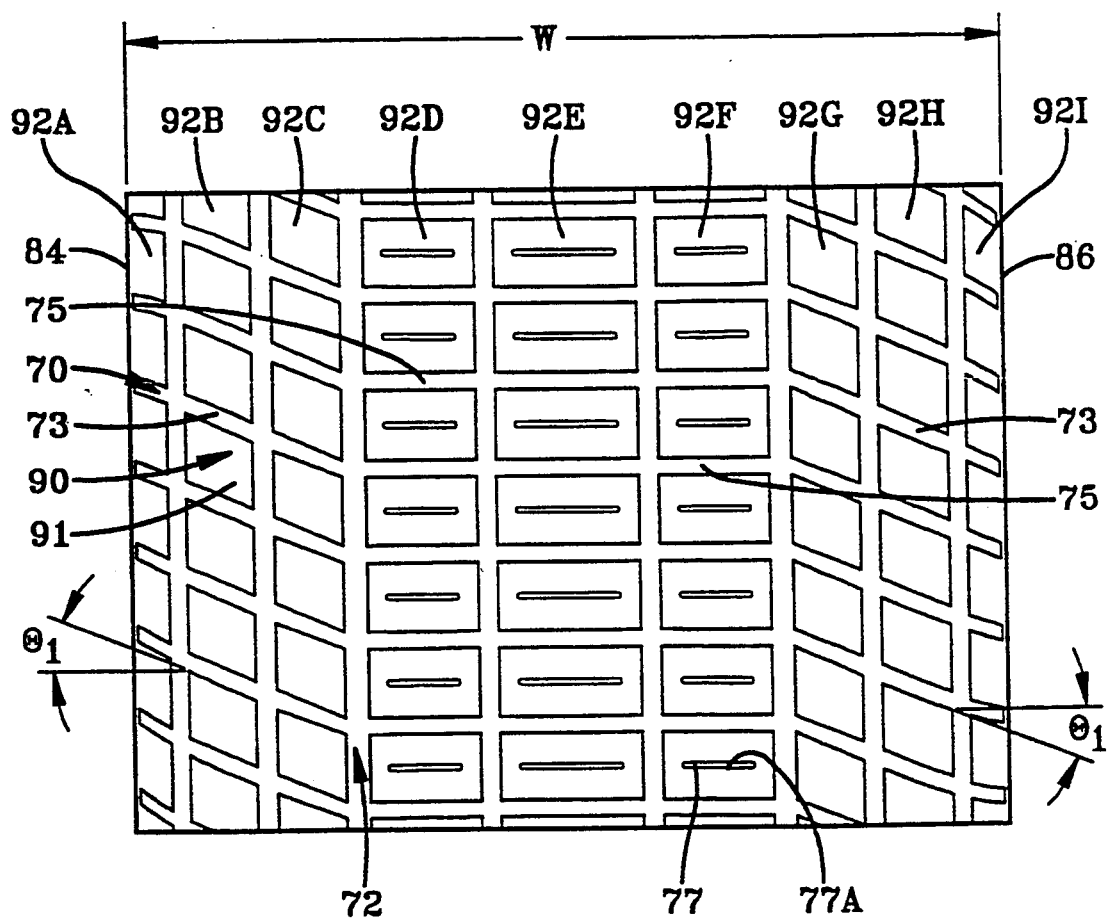
FIG. 11 is an enlarged plan view of a portion of the tread.

The tread 42 has a plurality of generally lateral extending grooves 50 and a plurality of circumferentially continuous grooves 52. The combination of lateral and circumferential grooves 50,52 define tread elements 60. Each tread element 60 has an outer surface 61 of parallelogram shape. The tread elements 60 have leading edges 62 and trailing edges 64 defined by the lateral grooves 50. The lateral grooves 50 have a first portion 53 of the groove 50 extending a distance of at least 5% of the tread width from a tread edge 44,46 toward the center of the tread 40, the first portion 53 extending from the tread edge 44,46 being inclined at an angle $\theta_1$ of 25° or less, preferably about 23°. The remaining second portion 55 of the lateral groove 50 is parallel to a plane passing through the axis of rotation. The centrally located tread elements 60 defined by the circumferential grooves and the second portion of the lateral grooves have a parallelogram shaped outer surface 61 that is rectangular. As illustrated, except for the circumferential row 68 of tread elements 66, all other rows of rectangular elements 66 have circumferential extents 65 less than one half the extent of the axially extending leading or trailing edge 62,64 of the tread element 66. These rectangular elements 66 also preferably include sipes 67. At least one such sipe 67 is located in each rectangular element 66, except those elements of row 68. As illustrated in FIGS. 8 and 9, the sipes 67 extend radially inward from the outer surface 61 a distance less than one half the groove depth (h). It is believed that the use of tread elements 60,66 with a short circumferential extent relative to the axial length or extent permits many more tread elements to be employed in the central portion of the tread. Each of these elements provides a long axially extending leading edge 62 and a sipe edge 67A for improved traction on a dirt surface.

The asymmetrical tread 42 has a first tread portion A extending from the first tread edge 44 a distance of less than 45%. The first tread portion A has a net-to-gross ratio of 0.70 or less. A second tread portion B extends from the first tread portion A to the second tread edge 46. The second tread portion B has a net-to-gross ratio greater than 0.75, preferably 0.78. The combination of the first tread portion A and the second tread portion B have a combined or overall net-to-gross ratio of 0.74 in the preferred embodiment. The tread elements 60,66 of the first portion A have a circumferential extent at least ⅓ greater than the tread elements of the second portion B.

As shown in FIGS. 6 and 7, the inclined portions 53 of the lateral grooves 50 adjacent the first and second tread edges 44,46 are oriented substantially parallel at preferably the same angular inclination $\theta_1$ relative to a plane passing through the axis of rotation.

As illustrated in FIG. 8, the cross section of the tire 40 includes a carcass structure 30 having the same basic components as the prior art bias pneumatic tire. The carcass 30 includes a pair of beads 31, a pair of apexes 33, a pair of bias plies 34,36 and an inner liner 32. The tire 40 has a pair of sidewalls 38 extending from the beads 31 to the tread 42. The tread 42 includes a plurality of tread elements 60 defined by the lateral and circumferential grooves 50,52.

Figure 8A:
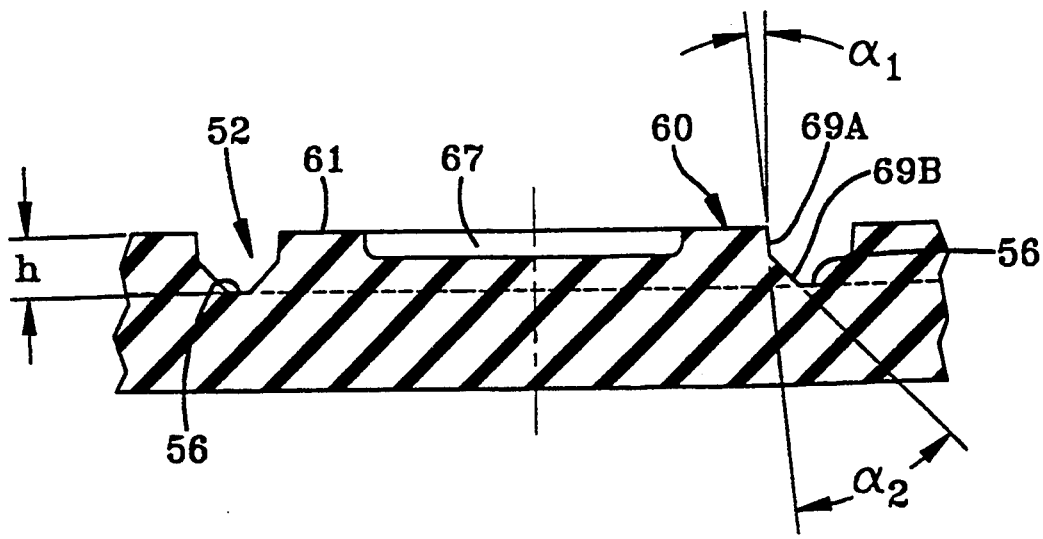
FIG. 8A is an enlarged view of a portion of a tread as taken from FIG. 8.

As shown in FIGS. 8A and 9, each tread element 60 has four groove walls 69 extending radially outwardly from the base 56 of the groove 50,52. The groove wall 69 includes a radially outer portion 69A which is inclined at an angle $\alpha_1$ of about 10° or less relative to the radial direction and a radially inner portion 69B which is inclined at an angle $\alpha_2$ in the range of 30° to 60°, preferably 45° relative to the radial direction. It is believed that the two portion groove wall 69 effectively stiffens the tread elements 60 and improves the traction characteristics of the tread.

FIGS. 10 through 13 illustrate a pneumatic tire 80 employing a symmetrical tread pattern 82 according to the present invention. The tread 82 as illustrated has lateral grooves 70 and circumferentially continuous grooves 72 which define tread elements 90 having an outer surface 91 having a parallelogram shape. The tread 82 has a first tread edge 84 and a second tread edge 86. The distance between tread edges defines the tread width (W).

In the illustrated embodiment, the tread elements are axially aligned in nine rows 92A,92B,92C,92D,92E, 92F,92G,92H,92I. The three central rows 92D,92E,92F of elements 90 are of rectangular shape. The elements 40 of the center row 92E are axially greater in extent than the adjacent rows of elements. Each of the three central rows 92D,92E,92F of elements 90 has leading and trailing edges 94,96 parallel to the axis of rotation AR. Each of the central elements 92D,92E,92F has an axial extent at least twice the circumferential extent of the element.

It is preferable that the elements 90 are circumferentially aligned at adjacent ends as shown. Alternatively, some or all of the rows 92A-92I of elements 90 could be staggered. As shown, the laterally extending grooves 70 extend from approximately the first tread edge 84 across the entire width (W) of the tread to approximately the second tread edge 86. As previously discussed in the asymmetrical version, the symmetrical tread 82 has lateral grooves 70 have a groove portion 73 extending from a tread edge 84 or 86 a distance of at least 5% of the tread width (W) that are inclined at an angle $\theta_1$ 25° or less relative to a plane parallel to and passing through the axis of rotation AR. Preferably the angle $\theta_1$ is 23°. As illustrated, the lateral groove at the first tread edge 84 is oriented the same as the lateral grooves adjacent the second edge 86.

The central rows of tread elements 92D,92E,92F each includes a sipe 77. The combination of the leading edges of the tread elements and the sipe edge 77A provides additional forward traction for the tires.

Figure 12:
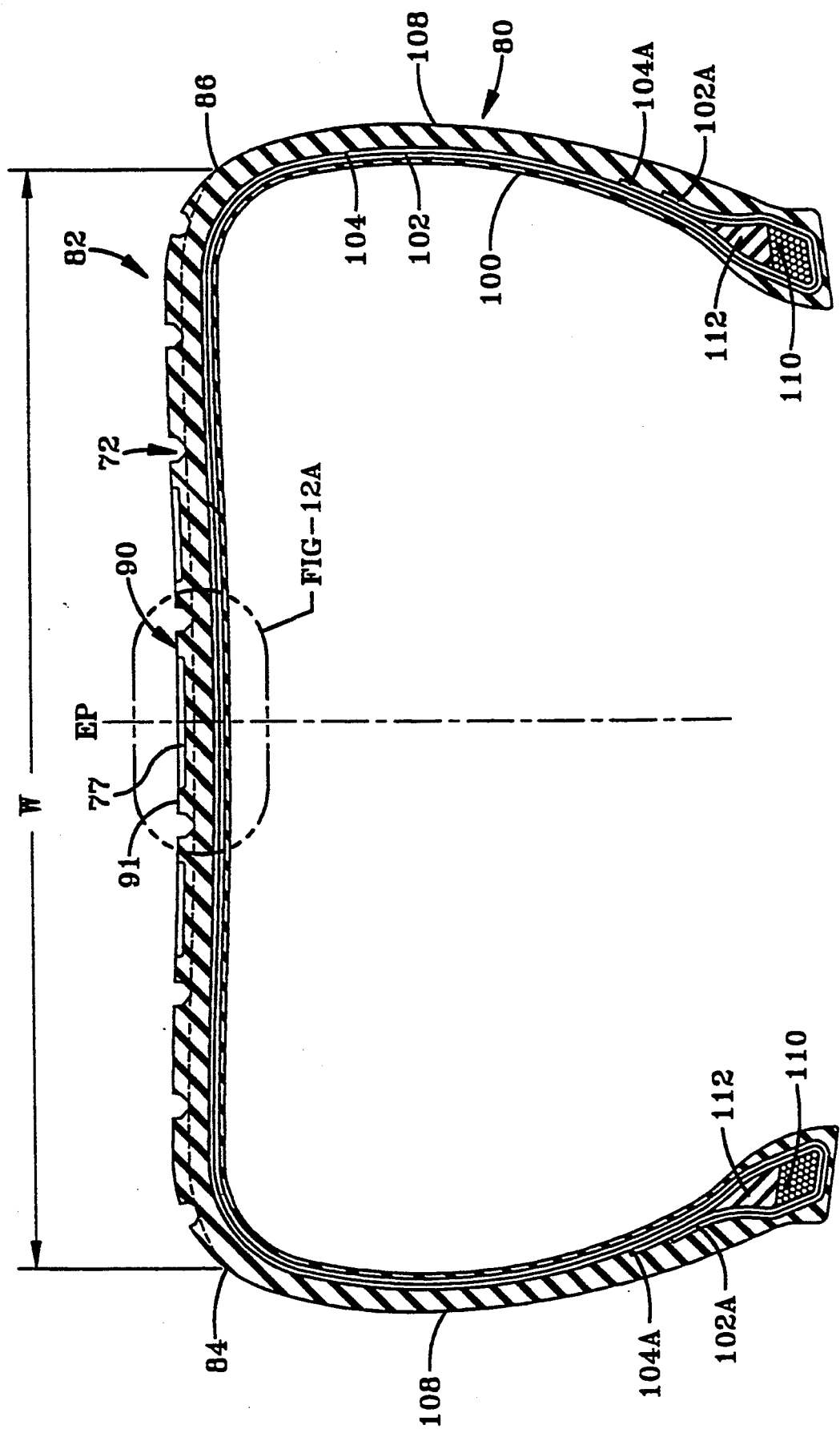
FIG. 12 is a cross-sectional view of the tire as shown in FIG. 10 taken along lines 12—12.
Figure 12A:
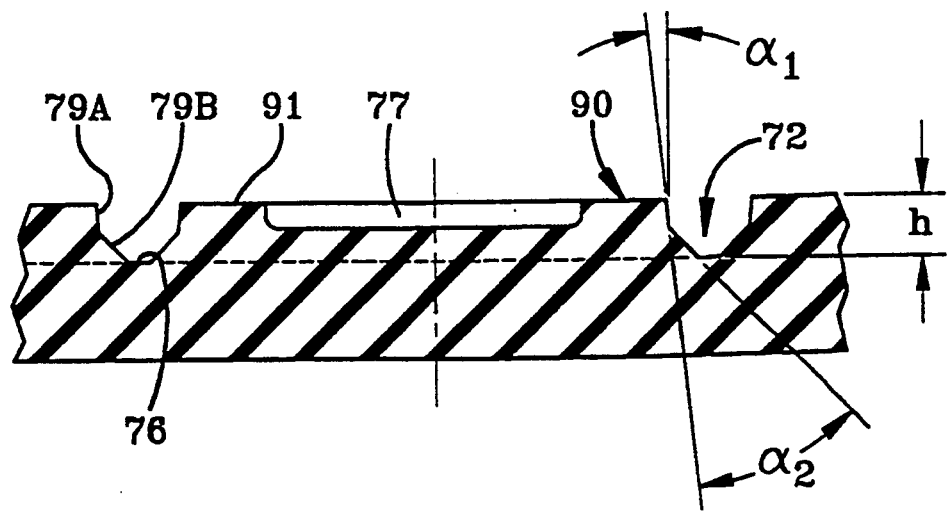
FIG. 12A is an enlarged view of a portion of the tread as taken from FIG. 12.
Figure 13:
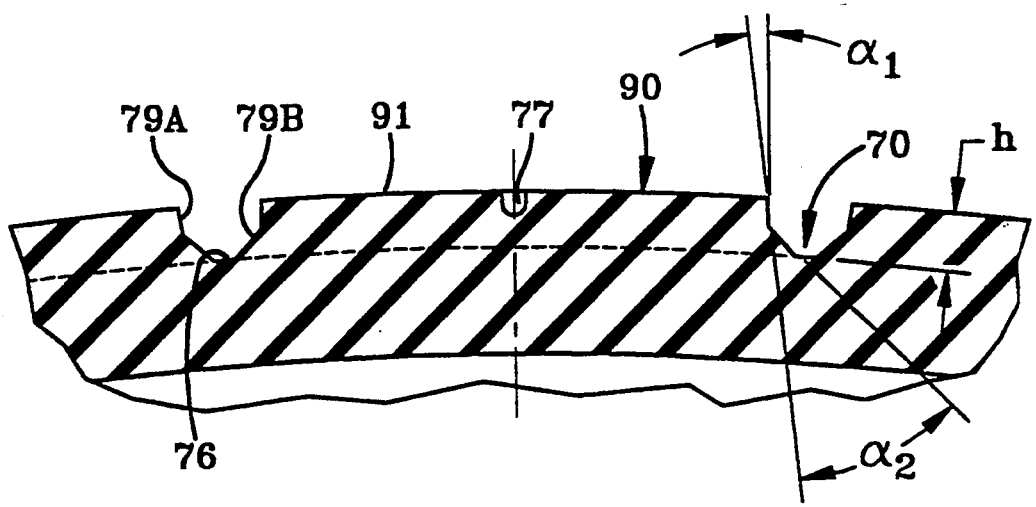
FIG. 13 is an enlarged view of a portion of the tread as taken from FIG. 10.

As shown in FIG. 12, the symmetrical treaded pneumatic tire has a tread 82, a pair of sidewalls 108, two annular beads 110, and a pair of carcass plies 102,104 reinforced with textile cords oriented at a bias angle, the plies extending from bead to bead, each ply 102,104 having a turnup portion 102A, 104A wrapped about each bead, a pair of apexes 112, and an innerliner 100. The tread has a plurality of parallelogram-shaped tread elements. As shown in FIGS. 12A and 13, each tread element 90 has four groove walls 79. The groove walls include a radially outer portion 79A and a radially inner portion 79S. The radially inner portion 79A is inclined at an angle $\alpha_1$ of about 10° or less relative to the radial direction. The radially outer portion 79S is inclined at an angle $\alpha_2$ in the range of 30° to 60°, preferably 45° relative to the radial direction. The two portion groove walls stiffen the elements.

The asymmetrical tread pattern tire as illustrated in FIGS. 6-9 was tested at the Fremont Speedway in Ohio. The Fremont track is noted for its slick track conditions. It is a flat ½ mile dirt oval. The typical lap times for the prior art tire 10 as shown in FIGS. 1-5 were in the 16.5-17.0 seconds per lap as recorded Aug. 10, 1991. The typical lad times for the tire 40 according to the present invention using a similar tread compound having a Shore A of about 35 as that of the prior art tire were 15.7 to 16.5 seconds per lap as measured Aug. 8, 1992. Comparing the fastest lap times, the new tire 40 was 0.8 seconds faster than the prior art tire 10. Comparing the slowest lap times, the new tire 40 was 0.5 seconds per lap faster than the prior art tire. In racing, fractions of seconds per lap means the difference from being competitive or not. The increase in the amount of leading edges available to provide forward traction, the change in the angle $\theta_2$ to less than 23° from the prior art's $\theta_1$ of about 30°, and the stiffened tread elements having four groove walls with two different angles of inclination, are believed to contribute to the improved performance. Also, the use of centrally located tread elements with a leading and trailing edge that is parallel to the axis of rotation of the tread as opposed to the prior art elements which were inclined at an angle $\theta_2$ of about 10° relative to the axis is believed to improve the traction performance of the tire 40 when compared to the tire 10 of the prior art.

What is claimed:

1. A pneumatic tire having an axis of rotation and an annular tread, the tread comprising
    a plurality of circumferentially continuous grooves and a plurality laterally extending grooves, each groove having a radially inner base; and
    a plurality of tread elements of parallelogram shape defined by the circumferential and lateral grooves, each tread element having four radially extending groove walls, each wall having an outer portion inclined less than 10° relative to the radial direction and an inner portion extending between the outer portion and the groove base being inclined at least 30° relative to the radial distance wherein the radial extent of the inner portion is equal to or greater than the radial extent of the outer portion;
    and the tread has a first and a second tread edge, the distance between the edges defining the tread width (W) and wherein each lateral groove has a first portion of the groove extending angularly from a tread edge and a second centered portion being parallel to the axis of rotation, the lateral groove first portions adjacent the first edge being substantially parallel to the lateral groove first portions adjacent the second edge, the first portions adjacent a tread edge are inclined about 25° relative to a plane passing through the axis of rotation.

2. The pneumatic tire of claim 1 wherein the lateral groove portions adjacent a tread edge are inclined about 23° relative to a plane passing through the axis of rotation.

3. The pneumatic tire of claim 1 wherein the tread is asymmetrical.

4. The pneumatic tire of claim 1 wherein the tread elements circumferentially adjacent the second central portions of the lateral grooves are of a parallelogram shape, the shape being rectangular.

* * * * *